Figure 1A:
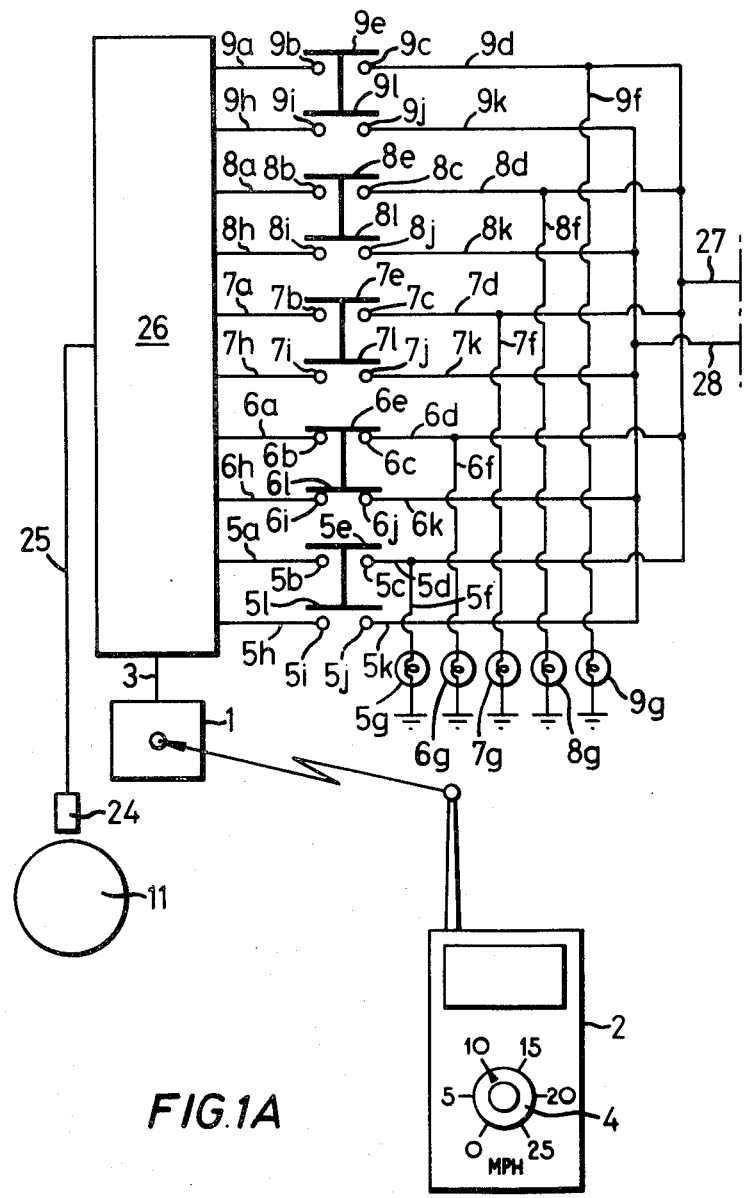

United States Patent [19]

Steel

[11] 4,433,746

[45] Feb. 28, 1984

[54] VEHICLE SPEED CONTROL

[75] Inventor: James Steel, Newcastle Upon Tyne, England

[73] Assignee: Ogden Electronics Ltd., Yorkshire, England

[21] Appl. No.: 245,205

[22] Filed: Mar. 18, 1981

[30] Foreign Application Priority Data

Mar. 19, 1980 [GB] United Kingdom ............... 8009243
Sep. 25, 1980 [GB] United Kingdom ............... 8031051

[51] Int. Cl.$^3$ .................................... B60Q 1/54
[52] U.S. Cl. ................................. 180/171; 340/53; 340/670
[58] Field of Search ............... 180/170–179, 180/79.1, 168, 169; 123/349–358; 361/236, 242; 307/96–97; 340/53, 62, 670

[56] References Cited

U.S. PATENT DOCUMENTS

| | | | |
|---|---|---|---|
| 2,803,743 | 8/1957 | Ballerait | 180/79.1 |
| 3,396,811 | 8/1968 | Bowers et al. | 340/53 |
| 3,437,188 | 4/1969 | Long | 192/70.14 |
| 3,578,108 | 5/1971 | McConnell | 180/106 |
| 3,656,099 | 4/1972 | Campbell | 340/62 |
| 3,686,628 | 8/1972 | Keller | 180/171 |
| 3,691,525 | 9/1972 | McClellan et al. | 340/62 |
| 3,882,973 | 5/1975 | Hakes | 188/181 R |
| 3,948,856 | 4/1976 | Gentel et al. | 303/21 A |
| 3,985,195 | 10/1976 | Tixier | 180/168 |
| 4,101,870 | 7/1978 | Ekman | 180/171 |
| 4,136,329 | 1/1979 | Trobert | 123/198 DB |
| 4,193,643 | 3/1980 | Miller | 303/97 |
| 4,229,727 | 10/1980 | Gilhooley | 180/171 |
| 4,234,051 | 11/1980 | Morris | 180/178 |
| 4,250,854 | 2/1981 | Matsui et al. | 180/179 |
| 4,294,204 | 10/1981 | Hurner | 340/52 F |

FOREIGN PATENT DOCUMENTS 650130 2/1979 Belgium .
220704 10/1981 France .

Primary Examiner—Joseph F. Peters, Jr.
Assistant Examiner—Timothy Roesch
Attorney, Agent, or Firm—Cushman, Darby & Cushman

[57] ABSTRACT

Apparatus for controlling speed of a vehicle having a retarder includes a receiver (1) for receiving signals from a transmitter (2) indicative of a reference speed and a processor (26) for comparing actual speed of the vehicle with the reference speed and for generating output signals if the actual speed is in excess of the reference speed, the output signals controlling valves (13, 14 and 15) of an air supply system (12) to the retarder and being arranged to operate sequentially to control progressively magnitude of power supplied to the retarder if the vehicle speed is not reduced during sequential periods of predetermined duration.

9 Claims, 2 Drawing Figures

VEHICLE SPEED CONTROL

DESCRIPTION

This application is related to my commonly assigned copending application Ser. No. 245,206, also filed on Mar. 18, 1981.

The present invention relates to apparatus for controlling speed of a vehicle.

With heavy vehicles, such as large dump trucks used in the mining and construction industries for transporting loads of up to, for example, 85 tons, it is known to provide a retarder for each such vehicle. The retarder of such a vehicle generally comprises a pneumatic coupling in the form of a pair of rotary members which cooperate one with another to define an air chamber therebetween, the arrangement being such that rotation of one member relative to the other to effect retardation of the vehicle is controlled by pressure of air directed into the chamber. The air pressure is controlled by a valve which generally is operated by a manually operable lever located adjacent a steering column of the vehicle.

In the mining and construction industries it is desirable for safety reasons to ensure that dump trucks, especially when laden, travel at slow speed, i.e. below 25 m.p.h. One method of imposing restrictions on the speed at which such vehicles should move is to provide notices addressed to drivers of the vehicles indicating an upper speed beyond which the vehicles should not be driven. Such methods of imposing speed restrictions are unsatisfactory because instructions displayed on notices often are not acted upon by drivers to whom the notices are addressed.

Furthermore, driving such vehicles at slow speed often frustrates drivers of the vehicles with a result that the vehicles may be driven at a speed beyond that predetermined and displayed on the notices.

According to the present invention, there is provided apparatus for controlling speed of a vehicle having a retarder, the apparatus comprising means for transmitting first signals indicative of a reference speed, means for generating second signals indicative of speed of the vehicle, means for comparing the first and second signals and for generating third signals when the second signals are indicative that the speed of the vehicle is in excess of the reference speed, and control means responsive to the third signals, the control means being adapted to control operation of the retarder so that, when the speed of the vehicle exceeds the reference speed, the vehicle is retarded by the retarder until the vehicle speed is below the reference speed.

The control means may include a plurality of devices sequentially operable to control progressively magnitude of power applied to the retarder.

Sequential operation of the devices may be controlled in accordance with length of a period during which the vehicle speed exceeds the reference speed.

Sequential operation of the devices may be controlled by timing means.

The timing means may comprise a plurality of timing devices.

The apparatus may be provided with a plurality of indicating devices each associated with a corresponding one of the timing devices and each adapted to be activated on activation of a corresponding timing device.

Each indicating means may comprise apparatus for providing visual and audible signals.

The control means may be controlled to release the retarder on operation of reset means.

The reset means may be a switch included in the control means.

The reset switch may be operable by manual control.

In this specification the expression "manual control" means control by human intervention and may include operation by a human limb, such as a hand or a foot.

The control means may be provided with indicating means for indicating when the speed of the vehicle exceeds a reference speed.

The transmitting means may be adapted to transmit different signals representative of different reference speeds, the transmitting means being adapted to select each said reference speed.

Following is a description, by way of example only and with reference to the accompanying drawing, of one method of carrying the invention into effect.

In the drawing

Figure 1B:
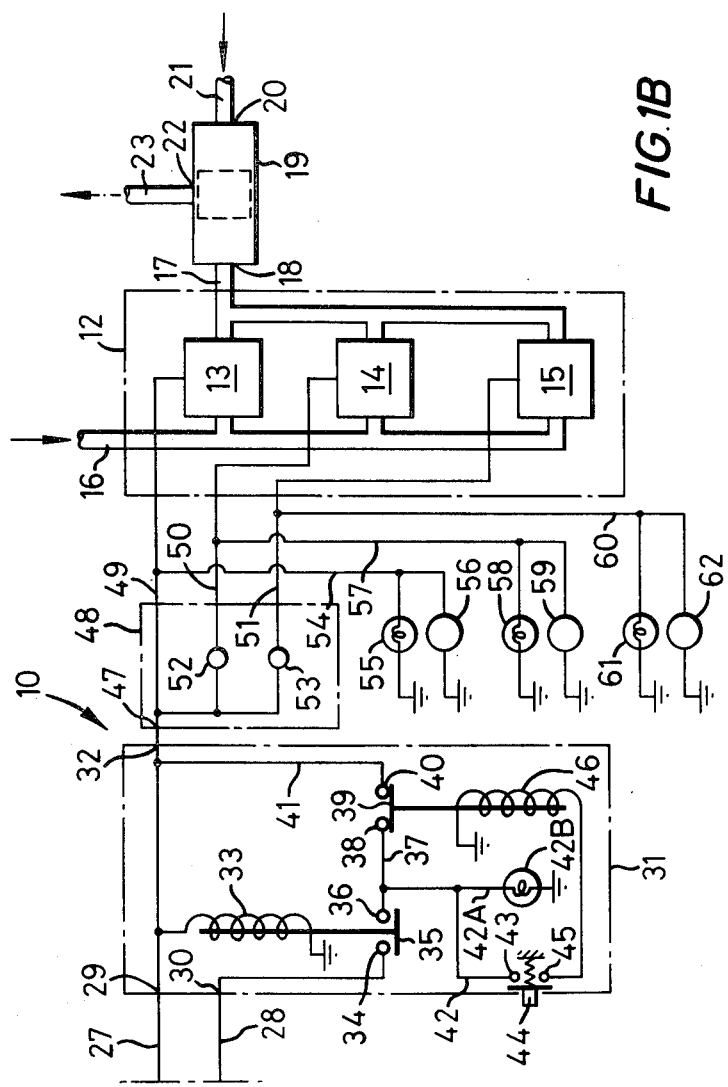

FIG. 1A is a diagramatic representation of apparatus for transmitting and receiving signals and for comparing the signals with other signals in accordance with the present invention, and FIG. 1B is a continuation of FIG. 1A showing a diagramatic representation of apparatus for controlling retarding means of a vehicle in accordance with signals received from the apparatus shown in FIG. 1A.

Refering now to FIG. 1A of the drawing, there is shown a receiver 1 carried on a vehicle (not shown) and adapted to receive radio signals from a transmitter 2 mounted adjacent a roadway along which the vehicle is driven. The receiver 1 is connected to a processor 26, also carried on the vehicle, by means of a line 3.

The signals transmitted to the receiver 1 by the transmitter 2 are indicative of reference speed of the vehicle. The reference speed is selected by a dial 4 on the transmitter and may be any one of 5 m.p.h.; 10 m.p.h.; 15 m.p.h.; 20 m.p.h. or 25 m.p.h., the signal transmitted by the transmitter varying in accordance with each corresponding selected speed. The signals thus received by the receiver 1 carried by a vehicle moving relative to the transmitter 2 are indicative of a selected reference speed for the vehicle when moving along the roadway adjacent which the transmitter is located and are transmitted from the receiver 1 to the processor 26 along the line 3.

The processor 26 is provided with five pairs of lines, 5a, 5h; 6a, 6h; 7a, 7h; 8a, 8h and 9a, 9h, each being connected to a corresponding one of terminals 5b, 5i; 6b, 6i; 7b, 7i; 8b, 8i and 9b, 9i. The terminals are each included in corresponding switches comprising a second terminal 5c, 5j; 6c, 6j; 7c, 7j; 8c, 8j; and 9c, 9j connected to a line, 5d, 5k; 6d, 6k; 7d, 7k; 8d, 8k and 9d, 9k and switch contacts 5e, 5L; 6e, 6L; 7e, 7L; 8e, 8L; and 9e, 9L, the contacts of each pair being ganged. The lines 5d, 6d, 7d, 8d, and 9d are connected in parallel one with another and in series with a first output line 27 and the lines 5k, 6k, 7k, 8k, and 9k are connected in parallel one with another and in series with a second output line 28. The lines 5d, 6d, 7d, 8d, and 9d are tapped by a corresponding one of lines 5f, 6f, 7f, 8f, and 9f each of which is connected to a corresponding one of indicator lamps 5g, 6g, 7g, 8g, and 9g.

The arrangement is such that the ganged pair of switch contacts 5e, 5L; 6e, 6L; 7e, 7L; 8e, 8L, and 9e, 9L are closed when corresponding relays (not shown) are operated and the relays are controlled to operate in sequence by the processor 26 on receipt of signals received from the sensor 24 indicative of an increase in speed of the vehicle. The contacts 5e, 5L, are closed when the speed of the vehicle is greater than 0 m.p.h. but less than 6 m.p.h; the contacts 6e, 6L are closed when the speed of the vehicle is greater than 6 m.p.h. but less than 11 m.p.h; the contacts 7e, 7L are closed when the speed of the vehicle is greater than 11 m.p.h. but less than 16 m.p.h; the contacts 8e, 8L are closed when the speed of the vehicle is greater than 16 m.p.h. but less than 21 m.p.h. and the contacts 9e, 9L are closed when the speed of the vehicle is greater than 25 m.p.h.

The processor 26 is arranged to transmit signals along the corresponding pair of lines 5a, 5h; 6a, 6h; 7a, 7h; 8a, 8h and 9a, 9h when there is corelation between actual speed and reference speed.

In the example shown in FIG. 1A the reference speed selected by the dial 4 of the transmitter 2 is 10 m.p.h. and the speed of the vehicle is between 6 m.p.h. and 11 m.p.h., as indicated by the contacts 6e, 6L which are in a closed condition. When the vehicle exceeds 10 m.p.h., a signal is transmitted along the line 6a, across the contact 6e, along the line 6d and along the output line 27. The indicator lamp 6g is illuminated indicating that the speed of the vehicle is equal to or has exceeded 10 m.p.h. If the speed subsequently falls below 10 m.p.h., the signal transmitted along the line 6a to the line 27 is removed, the lamp 6g, being extinguished, and a signal is transmitted along the line 6h, across the contact 6L, along the line 6k and along the output line 28.

The effect of signals being transmitted to lines 27 and 28 will now be described with reference to FIG. 1B which shows apparatus 10 for controlling a pneumatic system of the vehicle. A portion of the braking system is shown at 12 and comprises three electrically operated valves 13, 14 & 15 each of which is connected to a common air supply through a conduit 16. An output of each of the valves 13, 14 & 15 is connected to a common feed conduit 17 which is connected to an input 18 of a slide valve 19. A second input 20 of the slide valve 19 has connected thereto a conduit 21. An outlet 22 of the slide valve 19 has connected thereto a conduit 23 for supplying a retarder (not shown) of the vehicle.

The arrangement is such that, if none of the valves 13, 14 & 15 is operated air supply can only be directed through the conduit 21 to the slide valve 19 and through the slide valve and the conduit 23 to the retarder to retard the vehicle. The pressure of air directed to the conduit 21 is controlled by operation of a lever (not shown) on a control column (not shown) of the vehicle.

The valve 13 is arranged such that, when operated, air supplied thereto is permitted to pass therethrough onward to the conduit 17 and to the slide valve 19, operating the slide valve and subsequently passing through the conduit 23 to the retarder. Similarly, the valves 14 and 15, when operated, also permit air supplied thereto to pass therethrough to the conduit 17 and the slide valve 19 and onward through the conduit 23 to the retarder. The valves 13, 14 and 15 are controlled, in a manner to be described hereinafter, to operate consecutively and the arrangement is such that, when the valve 13 is operated, only 30% of the pressure of the air supplied to the conduit 16 passes to the conduit 17 but, when the valve 14 is operated while the valve 13 continues to be operated, 60% of the pressure of the air supplied to the conduit 16 passes to the conduit 17 and, when the valve 15 is operated while the valves 13 and 14 continue to be operated, 90% of the pressure of the air supplied to the conduit 16 is passed to the conduit 17.

The lines 27, 28 are connected to input lines 29, 30 respectively of a latch and cancel unit 31. The input line 29 is connected to an output line 32 and is tapped by one end of a coil of a solenoid 33, the other end of which is earthed. The input line 28 is connected to a terminal 34 of a switch contact 35, the other terminal 36 of which is connected by a line 37 to a terminal 38 of another switch contact 39. The other terminal 40 of the switch contact 39 is connected by a line 41 to the output line 32.

The latch and cancel unit 31 also includes a line 42 tapped from the line 37 and connected to a terminal 43 of a "cancel" switch 44, the other terminal 45 of the switch 44 having connected thereto one end of a coil of a solenoid 46, the other end of the coil being earthed. The line 42 is tapped by a line 42A connected to a buzzer 42B.

The switch contact 35 is operated by the solenoid 33 and is normally open and the switch contact 39 is operated by the solenoid 46 and is normally closed.

The output line 32 of the latch and cancel unit 31 is connected to an input line 47 of a timing unit 48. The timing unit 48 has three output lines 49, 50 and 51. The output line 49 is a continuation of the input line 47. The output line 50 is tapped from the input line 47 and includes a timer 52 for delaying transmission of signals received from the input 47 for five seconds until transmitting the signals along the line 50. The output line 51 is tapped from the input line 47 and includes a timer 53 for delaying transmission of signals received from the input line 47 for thirteen seconds until transmitting the signals along the output line 51.

The output line 49 is connected to a terminal of the valve 13. The output line 50 is connected to a terminal of the valve 14 and the output line 51 is connected to a terminal of the valve 15.

The output line 49 is tapped by a line 54 connected to a warning lamp 55 and a buzzer 56 in parallel. The output line 50 is tapped by a line 57 which is connected to a warning lamp 58 and a buzzer 59 in parallel and the output line 51 is tapped by a line 60 connected to a warning lamp 61 and a buzzer 62 in parallel.

Assuming, therefore, that the speed of the vehicle exceeds the reference speed of 10 m.p.h., a voltage is supplied to output line 27 of the processor 26. In consequence, a voltage is transmitted along the input line 29 and the output line 32 of the latch and cancel unit 31, the input line 47 of the timing unit 48 and the output line 49 of the timing unit to the terminal of the valve 13. The valve 13 consequently is operated and air at 30% of the pressure supplied to the conduit 16 is passed through the conduit 17, the slide valve 19 and the conduit 23 to the retarder thereby effecting retardation of the vehicle. Simultaneously with operation of the valve 13 a voltage is directed along the line 54 causing the warning lamp 55 to illuminate and the buzzer 56 to sound. If the driver of the vehicle does not thereafter control the vehicle to reduce the vehicle speed after five seconds, a voltage is directed along the line 50 to the valve 14 causing the valve to operate and the pressure of air directed to the retarder through the conduits 17 and 23 to increase from 30% to 60% of the pressure of the air supplied to the conduit 16. A voltage also is directed along the line 57 with a result that the warning lamp 58 is illuminated and the buzzer 59 sounded. After a further thirteen seconds and assuming that no reduction of speed of the vehicle below 10 m.p.h. is effected, a voltage is applied along the line 51 to the valve 15 thereby operating the valve and increasing the pressure of the air supply to the retarder from 60% to 90% of the pressure of air supplied to the conduit 16 whilst simultaneously causing a voltage to be applied along the line 60 with a result that the warning lamp 61 is illuminated and the buzzer 62 is sounded.

The effect of 90% of full pressure of air directed to the retarder effects retardation of the vehicle to a speed below 10 m.p.h. with a result that the voltage applied to the output line 27 of the processor 26 is removed but a similar voltage is applied to the output line 28 of the processor 26 ensuring that the solenoid 33 remains energised and the switch contact 35 remains closed. The valves 13, 14 and 15 thus will continue to operate, the warning lamps 55, 58 and 61 will continue to be illuminated and the buzzers 56, 59 and 62 will continue to be sounded.

The apparatus is "reset" by operation of the "cancel" button 44 which connects the terminals 43 and 45 causing energisation of the solenoid 46 with a result that the switch contact 39 is opened and voltage supply to the output 32 of the latch and cancel unit 31 is cut off. The valves 13, 14 and 15 therefore are de-activated and compressed air supply to the conduit 17 is cut off. The retarder thus is de-activated and retardation of the vehicle is discontinued by means of automatic operation of the retarder.

In this manner, if the driver of a vehicle fails to take appropriate action to prevent the speed of the vehicle exceeding 10 m.p.h., the speed is automatically reduced by automatic operation of the retarder of the vehicle. The retarder continues to be automatically operated even after the vehicle speed has been automatically reduced to below the reference speed of 10 m.p.h. until the driver operates the "cancel" button 44.

It will be appreciated that the apparatus will operate in similar manner if any one of the other reference speeds is selected by the dial 4 of the transmitter and the vehicle exceeds the reference speed.

It will also be appreciated that a plurality of transmitters 2 may be located at spaced intervals adjacent and along the roadway to monitor speed of vehicles passing therealong and to control the speed if in excess of a reference speed.

I claim:

1. Apparatus for controlling the speed of a vehicle having a retarder, the apparatus comprising:
   means for transmitting first signals indicative of a reference speed to said vehicle and for receiving same thereat,
   means for generating second signals indicative of speed of the vehicle,
   means for comparing the first and second signals and for generating third signals when the second signals indicate that the speed of the vehicle is in excess of the reference speed, and
   control means automatically responsive to the third signals, the control means being adapted to automatically control operation of the retarder so that, when the speed of the vehicle exceeds the reference speed, the vehicle is retarded by the retarder until the vehicle speed is below the reference speed,
   said control means including a plurality of devices successively and sequentially operable in accordance with the length of an elapsed time period during which the vehicle speed exceeds the reference speed, said devices progressively controlling the magnitude of power applied to the retarder.

2. Apparatus as claimed in claim 1 wherein sequential operation of said devices is controlled by timing means.

3. Apparatus as claimed in claim 2 wherein said timing means comprises a plurality of timing devices.

4. Apparatus as claimed in claim 3 wherein there is provided a plurality of indicating devices each associated with a corresponding one of said timing devices and each adapted to be activated on activation of a corresponding timing device.

5. Apparatus as claimed in claim 4 wherein each said indicating means comprises apparatus for providing visual and audible signals.

6. Apparatus as claimed in claim 1 wherein the control means is controlled to release the retarder on operation of reset means.

7. Apparatus as claimed in claim 6 wherein the reset means is a switch included in the control means.

8. Apparatus as claimed in claim 7 wherein the reset switch is operable by manual control.

9. Apparatus as claimed in claim 1 wherein said control means is provided with indicating means for indicating when the vehicle speed exceeds a reference speed.

* * * * *